United States Patent
Li et al.

(10) Patent No.: US 11,092,828 B2
(45) Date of Patent: Aug. 17, 2021

(54) ANTI-PEEP DISPLAY, LIQUID CRYSTAL DISPLAY DEVICE AND ANTI-PEEP COMPONENT

(71) Applicant: BOE Technology Group Co., Ltd., Beijing (CN)

(72) Inventors: Zhongxiao Li, Beijing (CN); Xiaochuan Chen, Beijing (CN); Wenqing Zhao, Beijing (CN); Ming Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 589 days.

(21) Appl. No.: 16/072,948

(22) PCT Filed: Nov. 24, 2017

(86) PCT No.: PCT/CN2017/112830
§ 371 (c)(1),
(2) Date: Jul. 26, 2018

(87) PCT Pub. No.: WO2018/157632
PCT Pub. Date: Sep. 7, 2018

(65) Prior Publication Data
US 2021/0173240 A1 Jun. 10, 2021

(30) Foreign Application Priority Data
Mar. 2, 2017 (CN) .......................... 201710119933.6

(51) Int. Cl.
*G02F 1/13* (2006.01)
*G02F 1/1335* (2006.01)
*G02F 1/1347* (2006.01)
*G02F 1/137* (2006.01)
*G02F 1/1343* (2006.01)

(52) U.S. Cl.
CPC ............ *G02F 1/1323* (2013.01); *G02F 1/137* (2013.01); *G02F 1/1347* (2013.01);
(Continued)

(58) Field of Classification Search
CPC .................................................... G02F 1/1323
See application file for complete search history.

(56) References Cited

U.S. PATENT DOCUMENTS

| | | |
|---|---|---|
| 9,091,872 B2 | 7/2015 | Matsushima et al. |
| 2005/0200781 A1 | 9/2005 | Takatani |
| (Continued) | | |

FOREIGN PATENT DOCUMENTS

| | | | |
|---|---|---|---|
| CN | 101435952 A | 5/2009 |
| CN | 101630067 A | 1/2010 |
| (Continued) | | | |

OTHER PUBLICATIONS

International Search Report (including English translation) and Written Opinion of PCT/CN2017/112830, dated Feb. 24, 2018.
(Continued)

*Primary Examiner* — Edmond C Lau
(74) *Attorney, Agent, or Firm* — Fay Sharpe LLP

(57) ABSTRACT

Provided are an anti-peep display, a liquid crystal display device and an anti-peep component, the anti-peep display includes a backlight source, a liquid crystal display screen, and a grating layer and a black matrix layer which are arranged between the liquid crystal layer and the backlight source; the grating layer includes a grating layer controllable light-blocking area and a grating layer light-transmitting area that are alternately arranged; the black matrix layer includes a black matrix layer light-blocking area and a black matrix layer light-transmitting area that are alternately arranged; the grating layer light-transmitting area and the black matrix layer light-transmitting area are in one-to-one correspondence, and the grating layer light-transmitting area is aligned with the black matrix layer light-transmitting area corresponding to the grating layer light-transmitting area in a direction perpendicular to the liquid crystal layer.

20 Claims, 12 Drawing Sheets

(52) U.S. Cl.
CPC .. *G02F 1/133504* (2013.01); *G02F 1/133512* (2013.01); *G02F 1/134309* (2013.01)

(56) References Cited

U.S. PATENT DOCUMENTS

| | | |
|---|---|---|
| 2009/0109169 A1 | 4/2009 | Sumiyoshi et al. |
| 2010/0014313 A1* | 1/2010 | Tillin ................ G02B 27/0101 362/606 |
| 2014/0361990 A1* | 12/2014 | Leister .............. G02F 1/133753 345/156 |
| 2017/0108629 A1 | 4/2017 | Lin |
| 2018/0088438 A1 | 3/2018 | Wang et al. |
| 2018/0144671 A1 | 5/2018 | Li |

FOREIGN PATENT DOCUMENTS

| | | |
|---|---|---|
| CN | 102681232 A | 9/2012 |
| CN | 103605237 A | 2/2014 |
| CN | 104656307 A | 5/2015 |
| CN | 105589256 A | 5/2016 |
| CN | 105700226 A | 6/2016 |
| CN | 106353916 A | 1/2017 |
| CN | 106646954 A | 5/2017 |
| JP | 2005265920 A | 9/2005 |

OTHER PUBLICATIONS

The First Office Action of the priority Chinese patent application No. 201710119933.6 dated Feb. 3, 2019.

\* cited by examiner

ANTI-PEEP DISPLAY, LIQUID CRYSTAL DISPLAY DEVICE AND ANTI-PEEP COMPONENT

CROSS REFERENCE TO RELATED APPLICATIONS

This application is a 371 of PCT Patent Application Serial No. PCT/CN2017/112830 filed Nov. 24, 2017, which claims priority to Chinese Patent Application No. 201710119933.6, filed with the State Intellectual Property Office of China on Mar. 2, 2017 and titled "ANTI-PEEP DISPLAY AND LIQUID CRYSTAL DISPLAY DEVICE", the entire contents of which are incorporated herein by reference.

TECHNICAL FIELD

The present disclosure relates to an anti-peep display, a liquid crystal display device and an anti-peep component.

BACKGROUND

The liquid crystal display technology has already become a display technology that dominates the market. A liquid crystal display device based on the liquid crystal display technology can satisfy people's demands in terms of pixel resolution, response time, screen size and other display technologies. However, in some special display environments, people need the liquid crystal display device with a special display mode to meet specific demands. For example, in an office environment or other private environments, the image information displayed on the liquid crystal display device screen is required to be visible only to a person himself/herself but not to others. This requires that the liquid crystal display device should have an anti-peep display mode. In some cases, people need to share this display system (i.e., the image information displayed on the liquid crystal display device screen) with others. This requires that the liquid crystal display device has a shared display mode, which is also called a normal display mode. Therefore, the anti-peep display has attracted a widespread concern.

SUMMARY

There are provided an anti-peep display, a liquid crystal display device and an anti-peep component in the present disclosure.

In a first aspect of an embodiment of the present disclosure, there is provided an anti-peep display, including:

a backlight source;

a liquid crystal display screen including a liquid crystal layer;

a grating layer located between the liquid crystal layer and the backlight source and including a grating layer controllable light-blocking area and a grating layer light-transmitting area that are alternately arranged; and a black matrix layer located between the liquid crystal layer and the backlight source and including a black matrix layer light-blocking area and a black matrix layer light-transmitting area that are alternately arranged, wherein the grating layer light-transmitting area and the black matrix layer light-transmitting area are in one-to-one correspondence, and the grating layer light-transmitting area is aligned with the black matrix layer light-transmitting area corresponding to the grating layer light-transmitting area in a direction perpendicular to the liquid crystal layer.

Optionally, a width of the black matrix layer light-blocking area is less than a width of a sub-pixel of the liquid crystal display screen.

Optionally, the grating layer includes an upper electrode layer and a lower electrode layer that are oppositely arranged, and a liquid crystal unit arranged between the upper electrode layer and the lower electrode layer; where the upper electrode layer, the liquid crystal unit and the lower electrode layer form the grating layer controllable light-blocking area, and the grating layer light-transmitting area is formed between two adjacent liquid crystal units.

Optionally, the black matrix layer includes the black matrix layer light-blocking area made of a lightproof material, and the black matrix layer light-transmitting area is formed between two adjacent black matrix layer light-blocking areas.

Optionally, when the anti-peep display is in an anti-peep display mode, a distance between the grating layer and the black matrix layer, a distance between the two adjacent grating layer controllable light-blocking areas and a distance between the two adjacent black matrix layer light-blocking areas are arranged, so as enable light with an incident angle larger than an anti-peer angle to be blocked by the grating layer controllable light-blocking area, or to be totally reflected before entering the liquid crystal display screen.

Optionally, a number of the grating layer is one; a number of the black matrix layers is two, namely a first black matrix layer and a second black matrix layer; a distance between the first black matrix layer and the liquid crystal layer is less than a distance between the second black matrix layer and the liquid crystal layer; a width of a single black matrix layer light-blocking area of the second black matrix layer is less than a width of a single black matrix layer light-transmitting area of the first black matrix layer; and a sum of a width of a single black matrix layer light-blocking area of the first black matrix layer and the width of the single black matrix layer light-blocking area of the second black matrix layer is less than a width of a sub-pixel of the liquid crystal display.

Optionally, the first black matrix layer, the second black matrix layer and the grating layer are sequentially arranged from the liquid crystal layer to the backlight source.

Optionally, a distance between the first black matrix layer and the second black matrix layer is equal to a distance between the second black matrix layer and the grating layer.

Optionally, the first black matrix layer, the grating layer and the second black matrix layer are sequentially arranged from the liquid crystal layer to the backlight source.

Optionally, a distance between the first black matrix layer and the grating layer is equal to a distance between the grating layer and the second black matrix layer.

Optionally, the width of the black matrix layer light-blocking area is equal to a width of the grating layer controllable light-blocking area.

Optionally, the anti-peep display further includes a filling layer configured to adjust a layer spacing, where the filling layer is arranged between the grating layer and the black matrix layer, or between two adjacent black matrix layers.

In a second aspect of an embodiment of the present disclosure, there is provided a liquid crystal display device, including the anti-peep display provided in the first aspect of any embodiment of the present disclosure.

In a third aspect of an embodiment of the present disclosure, there is provided an anti-peep component, including: an upper substrate and a lower substrate that are oppositely arranged, and a grating layer and a black matrix layer that are located between the upper substrate and the lower substrate, where the grating layer includes a grating layer controllable light-blocking area and a grating layer light-transmitting area that are alternately arranged; the black matrix layer includes a black matrix layer light-blocking area and a black matrix layer light-transmitting area that are alternately arranged; and the grating layer light-transmitting area and the black matrix layer light-transmitting area are in one-to-one correspondence, and the grating layer light-transmitting area is aligned with a black matrix layer light-transmitting area corresponding to the grating layer light-transmitting area in a direction perpendicular to the upper substrate.

Optionally, the grating layer includes an upper electrode layer and a lower electrode layer that are oppositely arranged, and a liquid crystal unit arranged between the upper electrode layer and the lower electrode layer, the upper electrode layer, the liquid crystal unit and the lower electrode layer form the grating layer controllable light-blocking area, and the grating layer light-transmitting area is formed between two adjacent liquid crystal units.

Optionally, the black matrix layer includes the black matrix layer light-blocking area made of a lightproof material; and the black matrix layer light-transmitting area is formed between two adjacent black matrix layer light-blocking areas.

Optionally, where a number of the grating layer is one; a number of the black matrix layers is two, namely a first black matrix layer and a second black matrix layer; and a width of a single black matrix layer light-blocking area of the second black matrix layer is less than a width of a single black matrix layer light-transmitting area of the first black matrix layer.

Optionally, the first black matrix layer, the second black matrix layer and the grating layer are sequentially arranged from the upper substrate to the lower substrate, and a distance between the first black matrix layer and the second black matrix layer is equal to a distance between the second black matrix layer and the grating layer.

Optionally, the first black matrix layer, the grating layer and the second black matrix layer are sequentially arranged from the upper substrate to the lower substrate, and a distance between the first black matrix layer and the grating layer is equal to a distance between the grating layer and the second black matrix layer.

Optionally, the anti-peep component further includes a filling layer configured to adjust a layer spacing, where the filling layer is arranged between the grating layer and the black matrix layer, or between two adjacent black matrix layers.

DETAILED DESCRIPTION

To make the principles and advantages of the present disclosure clearer, the followings will further describe the present disclosure in detail with reference to specific embodiments and the accompanying drawings.

It should be noted that all descriptions using terms of "first" and "second" in the embodiments of the present disclosure are intended for distinguishing the two that are with the same name but actually are different entities or different parameters. It can be seen that the terms of "first" and "second" are only applied for convenience of description and should not be interpreted as limitations to the embodiments of the present disclosure, which will not be explained one by one in the subsequent embodiments.

Figure 1:
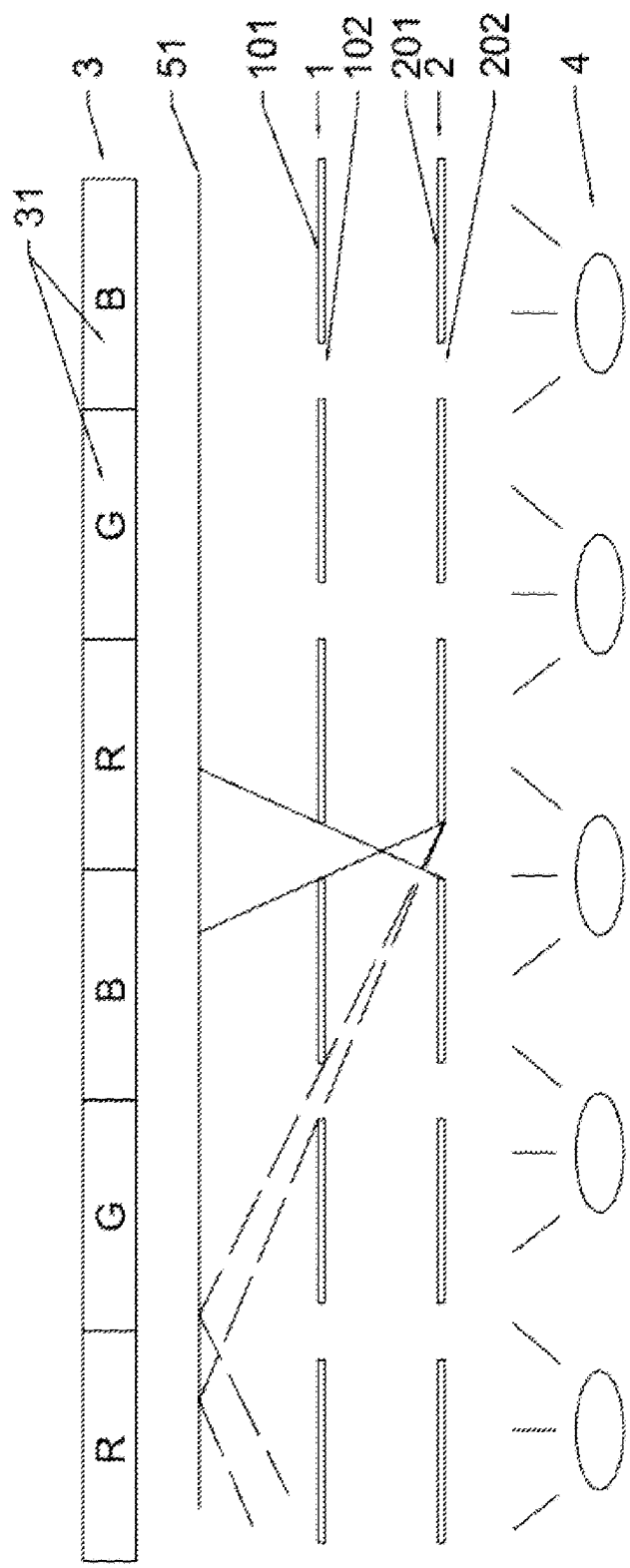
FIG. 1 is a schematic diagram of a principle of an anti-peep display mode in an anti-peep display provided by an embodiment of the present disclosure.

FIG. 1 is a principle diagram of an anti-peep display mode in an anti-peep display provided by an embodiment of the present disclosure.

Based on the foregoing description, as shown in FIG. 1, in a first aspect of the embodiment of the present disclosure, there is provided an anti-peep display, including:

a backlight source 4;

a liquid crystal display screen 3, where the liquid crystal display screen 3 includes a liquid crystal layer (not shown in FIG. 1);

a grating layer 1, where the grating layer 1 is located between the liquid crystal layer of the liquid crystal display screen 3 and the backlight source 4 and includes a grating layer controllable light-blocking area 101 and a grating layer light-transmitting area 102 that are alternately arranged; and a black matrix layer 2, where the black matrix layer 2 is located between the liquid crystal layer of the liquid crystal display screen 3 and the backlight source 4 and includes a black matrix layer light-blocking area 201 and a black matrix layer light-transmitting area 202 that are alternately arranged.

Herein, the grating layer light-transmitting area 102 and the black matrix layer light-transmitting area 202 are in one-to-one correspondence, and a grating layer light-transmitting area 102 is aligned with a corresponding black matrix layer light-transmitting area 202 in a direction perpendicular to the liquid crystal layer.

In the embodiment of the present disclosure, the grating layer light-transmitting area 102 is aligned with the corresponding black matrix layer light-transmitting area 202 in the direction perpendicular to the liquid crystal layer. That is, each grating layer light-transmitting area 102 is aligned with a black matrix layer light-transmitting area 202 corresponding to the each grating layer light-transmitting area 102 in the direction perpendicular to the liquid crystal layer. In addition, a center line of each grating layer light-transmitting area 102 coincides with a center line of the corresponding black matrix layer light-transmitting area 202. In other words, an orthographic projection of each grating layer light-transmitting area 102 on a preset plane (for example, a plane where the liquid crystal layer of the liquid crystal display screen 3 is located) coincides with an orthographic projection of the corresponding black matrix layer light-transmitting area 202 on the preset plane.

It should be noted that in practice, the orthographic projection of each grating layer light-transmitting area 102 on the preset plane and the orthographic projection of the corresponding black matrix layer light-transmitting area 202 on the preset plane may overlap but not coincide, as long as light may penetrate the grating layer light-transmitting area 102 and the black matrix layer light-transmitting area 202 corresponding to the grating layer light-transmitting area 102. In the embodiment of the present disclosure, as the orthographic projection of each grating layer light-transmitting area 102 on the preset plane coincides with the orthographic projection of the corresponding black matrix layer light-transmitting area, an area of a light-exiting surface of the anti-peep display may be guaranteed to the utmost extent, thereby improving the brightness of the light-exiting surface of the anti-peep display.

Referring to FIG. 1 again, when the grating layer controllable light-blocking area 101 is in a light-blocking state, light emitted from the backlight source 4 to the liquid crystal layer of the liquid crystal display screen 3 is blocked by the grating layer controllable light-blocking area 101 and the black matrix layer light-blocking area 201. When a distance between the grating layer 1 and the black matrix layer 2, a distance between the two adjacent grating layer controllable light-blocking areas 101 and a distance between the two adjacent black matrix light-blocking areas 201 are all appropriate, a maximum angle between the light that may be projected onto the liquid crystal layer of the liquid crystal display screen 3 and a normal direction of the liquid crystal layer of the liquid crystal display screen 3 is limited within a certain range. Since the light may be blocked by the grating layer controllable light-blocking area 101 and the black matrix layer light-blocking area 201, or a total reflection may be occurred before the light enters the liquid crystal layer of the liquid crystal display screen 3 due to an excessively large angle, the light beyond the certain range cannot be projected onto the liquid crystal layer of the liquid crystal display screen 3, thereby achieving a anti-peer effect and realizing an anti-peep display mode of the anti-peep display. Referring to FIG. 1, light indicated by solid lines is the light within an anti-peer angle, and light indicated by dotted lines is the light beyond the anti-peer angle (only the lights totally reflected are shown in FIG. 1, and the lights blocked by the grating layer controllable light-blocking area 101 and the black matrix layer light-blocking area 201 are not shown). The anti-peer angle is the maximum angle between the light that may be projected onto the liquid crystal layer of the liquid crystal display screen 3 and the normal direction of the liquid crystal layer of the liquid crystal display screen 3.

Optionally, the anti-peep display may further include a control module (now shown in FIG. 1) used to control the grating layer controllable light-blocking area 101 to be in a light-blocking state or in a light-transmitting state. When the grating layer controllable light-blocking area 101 is in the light-blocking state, the light emitted by the backlight source 4 is blocked, and when the grating layer controllable light-blocking area 101 is in the light-transmitting state, the light emitted by the backlight source 4 may penetrate the grating layer controllable light-blocking area 101. Only the black matrix layer light-blocking area 201 may block the light emitted by the backlight source 4 when the grating layer controllable light-blocking area 101 is in the light-transmitting state. Due to the alternative arrangement in the black matrix layer light-blocking area 201, the light emitted from the backlight source 4 may not be completely blocked in a certain direction. Thus, the anti-peep display may be in a normal display mode at this moment. According to the embodiment of the present disclosure, the anti-peep display may be kept in an anti-peep display mode or in a normal display mode by controlling the grating layer controllable light-blocking area 101 to be in the light-blocking state or the light-transmitting state.

Optionally, the black matrix layer 2 includes the black matrix layer light-blocking area 201 made of a lightproof material, and the black matrix layer light-transmitting area 202 is formed between the two adjacent black matrix layer light-blocking areas 201. Optionally, the black matrix layer light-transmitting area 202 can be formed between any two adjacent black matrix layer light-blocking areas 201. The lightproof material may be a black resin material.

It should be noted that the arrangement order of the grating layer 1 and the black matrix layer 2 has no decisive influence on a technical effect achieved by the present embodiment, and should not be regarded as a limitation to the protection scope of the present disclosure.

In the embodiment of the present disclosure, under the premise that the anti-peep display meets standards of the anti-peep display mode and the normal display mode, an aperture ratio of the anti-peep display may be increased as much as possible by reasonably setting a width of the black matrix layer light-blocking area 201, a width of the black matrix layer light-transmitting area 202, a width of the grating layer controllable light-blocking area 101, a width of the grating layer light-transmitting area 102, and a distance between the black matrix layer 2 and the grating layer 1, so as to reduce the energy consumption thereof. Optionally, when the width of the black matrix layer light-blocking area 201 is equal to that of the grating layer controllable light-blocking area 101, the anti-peep display in the embodiment may realize an anti-peep-display-mode viewing angle (i.e., the anti-peer angle) of about 20° and a normal-display-mode viewing angle of about 90°, and has an aperture ratio of 20% or above at the same time.

In this embodiment, the grating layer and the black matrix layer are arranged between the liquid crystal layer of the liquid crystal display screen and the backlight source, the grating layer controllable light-blocking areas are arranged on the grating layer, and the black matrix layer light-blocking areas are arranged on the black matrix layer, such that an anti-peer function can be achieved by a cooperation between the grating layer controllable light-blocking area and the black matrix layer light-blocking area, and the anti-peep display may be controlled to be in an anti-peep display mode or in a normal display mode by adjusting the grating layer controllable light-blocking area to be in a light-blocking state or in a light-transmitting state, thereby achieving a simple structure, a thin thickness and a low cost.

Referring to FIG. 1 again, in some embodiments, a width (not marked in FIG. 1) of the black matrix layer light-blocking area 201 is less than a width (not marked in FIG. 1) of a sub-pixel 31 of the liquid crystal display screen 3. As shown in FIG. 1, the sub-pixel 31 of the liquid crystal display screen 3 may include a red sub-pixel R, a green sub-pixel G and a blue sub-pixel B. Of course, the sub-pixel 31 of the liquid crystal display screen 3 may further include sub-pixels of other colors in practical applications, which will not be limited by the embodiments of the present disclosure.

It should be noted that only the black matrix layer light-blocking area 201 may block the light emitted by the backlight source 4 when the anti-peep display is in the normal display mode, At this moment, the width of the black matrix layer light-blocking area 201 is designed to be less than the width of the sub-pixel 31 of the liquid crystal display screen 3, such that the black matrix layer light-blocking area 201 may not completely shield any one of the sub-pixel 31. Hence, no sub-pixel loss occurs in the liquid crystal display screen 3, thereby ensuring the integrity of image information displayed on the liquid crystal display screen 3.

Figure 2:
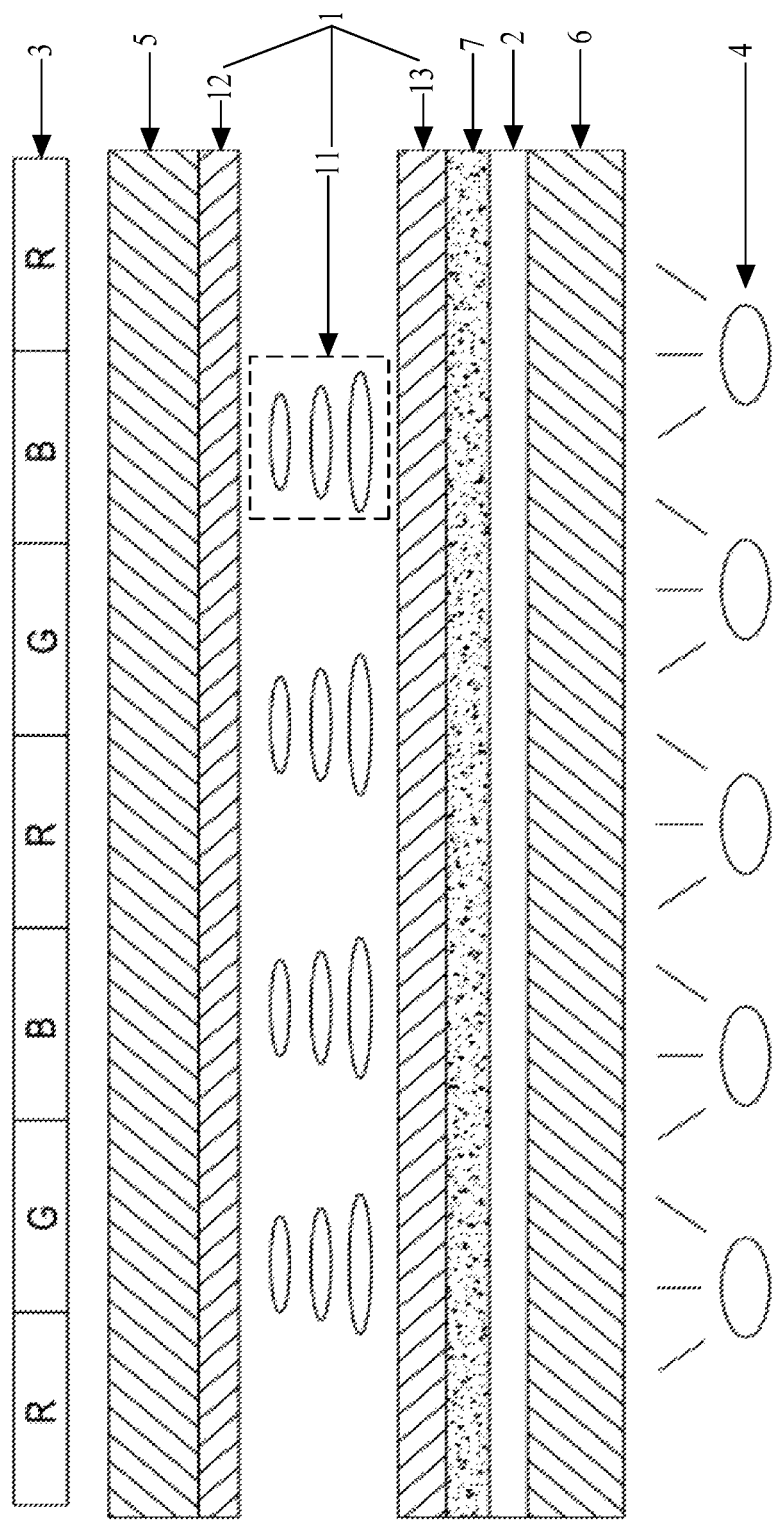
FIG. 2 is a schematic diagram of a structure of an anti-peep display provided by an embodiment of the present disclosure.

FIG. 2 is a schematic diagram of a structure of an anti-peep display provided by an embodiment of the present disclosure.

Optionally, with reference to FIG. 1 and FIG. 2, the grating layer 1 includes an upper electrode layer 12 and a lower electrode layer 13 that are oppositely arranged, and a liquid crystal unit 11 arranged between the upper electrode layer 12 and the lower electrode layer 13. The upper electrode layer 12, the liquid crystal unit 11 and the lower electrode layer 13 form the grating layer controllable light-blocking area 101. A grating layer light-transmitting area 102 is formed between the two adjacent liquid crystal units 11. Optionally, the grating layer light-transmitting area 102 can be formed between any two adjacent liquid crystal units 11. It should be noted that the grating layer light-transmitting area 102 formed between the two adjacent liquid crystal units 11 includes an area between the two adjacent liquid crystal units 11, an area on the upper electrode layer 12 corresponding to the area between the two adjacent liquid crystal units 11, and an area on the lower electrode layer 13 corresponding to the area between the two adjacent liquid crystal units 11.

Optionally, referring to FIG. 1 and FIG. 2 again, when adopted to control the grating layer 1, a control module (not shown in FIG. 1 and FIG. 2) is used to control the liquid crystal unit 11 to be in a light-blocking state or in a light-transmitting state by controlling voltages of the upper electrode layer 12 and the lower electrode layer 13, so as to control the anti-peep display to be in an anti-peep display mode or in a normal display mode. The control module may apply voltages to the upper electrode layer 12 and the lower electrode layer 13 respectively. In this way, a voltage difference may be formed between the upper electrode layer 12 and the lower electrode layer 13. Under the action of the voltage difference, a liquid crystal in the liquid crystal unit 11 deflects to block light or allow the light to pass, enabling the liquid crystal unit 11 to be in the light-blocking state or in the light-transmitting state.

Optionally, the arrangement order of the grating layer 1 and a black matrix layer 2 has no decisive influence on a technical effect achieved by the embodiments. As shown in FIG. 1 and FIG. 2, although the grating layer 1 is closer to the liquid crystal display screen 3 in the present embodiment, the black matrix layer 2 may be closer to the liquid crystal display screen 3 in other implementations. The arrangement order of the grating layer 1 and the black matrix layer 2 is not limited in the embodiments of the present disclosure.

Optionally, referring to FIG. 2 again, packaging is performed outside the grating layer 1 and the black matrix layer 2 by means of an upper substrate 5 close to the liquid crystal display screen 3 and a lower substrate 6 close to the backlight source 4 respectively. The upper electrode layer 12 of the grating layer 1 may be arranged on the upper substrate 5. The black matrix layer 2 and the lower electrode layer 13 of the grating layer 1 may be sequentially arranged on the lower substrate 6. The liquid crystal unit 11 of the grating layer 1 may be arranged between the upper electrode layer 12 and the lower electrode layer 13. The edges of the upper substrate 5 and the lower substrate 6 are sealed. It should be noted that in practice, planarization layers (not shown in FIG. 2) may be arranged on the upper electrode layer 12 and the lower electrode layer 13 respectively, and may planarize the upper electrode layer 12 and the lower electrode layer 13. As shown in FIG. 1, in the above-mentioned embodiments, a surface on which light of the backlight source 4 is totally reflected may be an upper surface 51 of the upper substrate 5.

Optionally, the upper electrode layer 12 and the lower electrode layer 13 may be configured as below. One of the upper electrode layer 12 and the lower electrode layer 13 includes a plurality of strip electrodes, and the other one is a planar electrode. The plurality of strip electrodes correspond to the liquid crystal units 11. For example, the upper electrode layer 12 includes the plurality of strip electrodes, and the lower electrode layer 13 is the planar electrode. Alternatively, the upper electrode layer 12 is the planar electrode, and the lower electrode layer 13 includes a plurality of strip electrodes. Alternatively, the upper electrode layer 12 and the lower electrode layer 13 each includes a plurality of strip electrodes, the plurality of strip electrodes of the upper electrode layer 12 are in one-to-one correspondence with the plurality of strip electrodes of the lower electrode layer 13, and the plurality of strip electrodes of the upper electrode layer 12 also correspond to the liquid crystal units 11.

Optionally, the electrodes in the upper electrode layer 12 and the lower electrode layer 13 are ITO (Indium Tin Oxide) electrodes or IZO (Indium Zinc Oxide) electrodes.

Furthermore, referring to FIG. 1 and FIG. 2 again, in some implementations, the anti-peep display further includes a filling layer 7 used to adjust a layer spacing. The filling layer 7 is arranged between the grating layer 1 and the black matrix layer 2. Of course, the filling layer 7 may be arranged between the two adjacent black matrix layers 2 when the anti-peep display includes at least two black matrix layers 2 in practical applications. On one hand, the filling layer 7 is to planarize a segment gap (namely, a segment gap between the black matrix layer light-blocking area 201 and the black matrix layer light-transmitting area 202) caused by protrusions of the black matrix layer light-blocking area 201 on the black matrix layer 2, so as to prevent the segment gap from running up to the grating layer 1. On the other hand, the filling layer 7 is used to adjust a distance between the black matrix layer 2 and the grating layer 1 or a distance between the two adjacent black matrix layers 2, enabling the anti-peep display to meet anti-peep demands.

The detailed design of the anti-peep display is further described in the embodiment. In the present embodiment, a voltage between the upper electrode layer and a lower electrode layer may be controlled by the control module, and a state of a liquid crystal molecule in the liquid crystal unit between the upper electrode layer and the lower electrode layer is further controlled, thereby controlling the liquid crystal unit to be in the light-blocking state or in the light-transmitting state. Since the liquid crystal units only have two states, i.e., black (light-blocking state of the liquid crystal unit) and white (light-transmitting state of the liquid crystal unit), only two voltages need to be applied between the upper electrode layer and the lower electrode layer by the control module. As the states of all the liquid crystal units are the same, only a peripheral line but not timing control is required to complete the control of the grating layer. Compared with the prior art, the control circuit is simple and stable.

In the above exemplary descriptions, the number of the black matrix layers is not limited. In fact, there may be one or more black matrix layers. When the number of the black matrix layer is one, in order to ensure that the light emitted by the backlight source is fully blocked in the anti-peep display mode, the black matrix layer light-blocking area may be wider. However, in this way, the aperture ratio of the black matrix layer may be limited to be relatively smaller, resulting in a relatively smaller aperture ratio of the anti-peep display at last. In order to reduce the width of the black matrix layer light-blocking area and increase the aperture ratio of the black matrix layer, two or more black matrix layers may be provided. The two or more black matrix layers may cooperate with each other to block the light emitted by the backlight source. As the number of blocking layers (the number of the black matrix layers) is increased, there are more blocking layers in the anti-peep display mode. Thus, under the premise of maintaining an original anti-peer angle of the anti-peep display, the width of the black matrix layer light-blocking area on a single black matrix layer may be appropriately reduced, so as to achieve an effect of increasing the aperture ratio of the black matrix layer.

In some embodiments, the number of the grating layer is one. The number of the black matrix layers is two, i.e., a first black matrix layer and a second black matrix layer. A distance between the first black matrix layer and the liquid crystal layer is less than a distance between the second black matrix layer and the liquid crystal layer. A width of a single black matrix layer light-blocking area of the second black matrix layer is less than a width of a single black matrix layer light-transmitting area of the first black matrix layer. The sum of the width of the single black matrix layer light-blocking area of the first black matrix layer and the width of the single black matrix layer light-blocking area of the second black matrix layer is less than a width of the sub-pixel of the liquid crystal display. It should be noted that the liquid crystal layer described herein means the liquid crystal layer of the liquid crystal display screen, rather than the liquid crystal unit of the grating layer.

In the present embodiment, the width of the single black matrix layer light-blocking area of the second black matrix layer is configured to be less than the width of the single black matrix layer light-transmitting area of the single first black matrix layer, so as to ensure that the black matrix layer light-blocking area of the second black matrix layer does not block the black matrix layer light-transmitting area of the first black matrix layer, and the light emitted by the backlight source may successfully penetrate the first black matrix layer at an arbitrary angle. The sum of the width of the single black matrix layer light-blocking area of the first black matrix layer and the width of the single black matrix layer light-blocking area of the second black matrix layer is less than the width of the sub-pixel of the liquid crystal display, such that the two black matrix layers may not completely block any sub-pixel of the liquid crystal display screen even if the black matrix layer light-blocking areas of the two black matrix layers are superimposed. Thus, no any sub-pixel loss occurs in the liquid crystal display screen, thereby ensuring that the integrity of image information displayed on the liquid crystal display screen.

Figure 3:
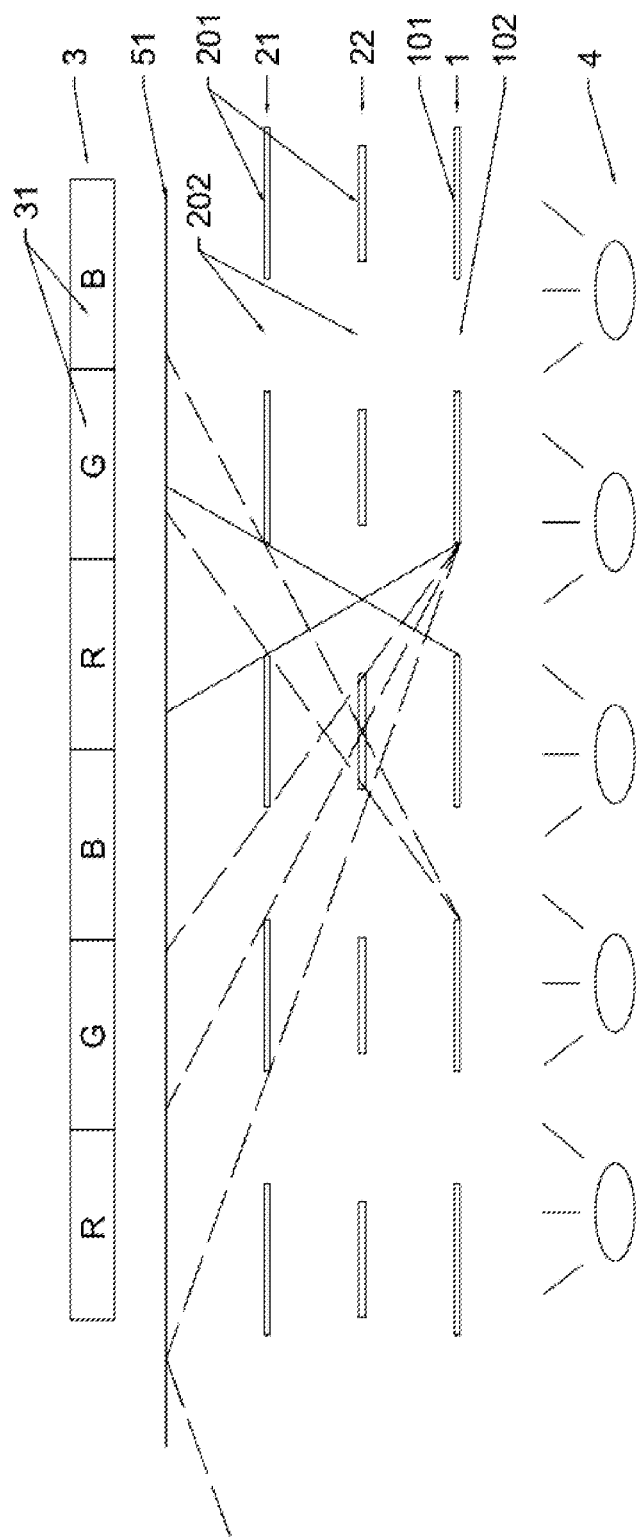
FIG. 3 is a schematic diagram of a principle of an anti-peep display mode in an anti-peep display provided by another embodiment of the present disclosure.
Figure 4:
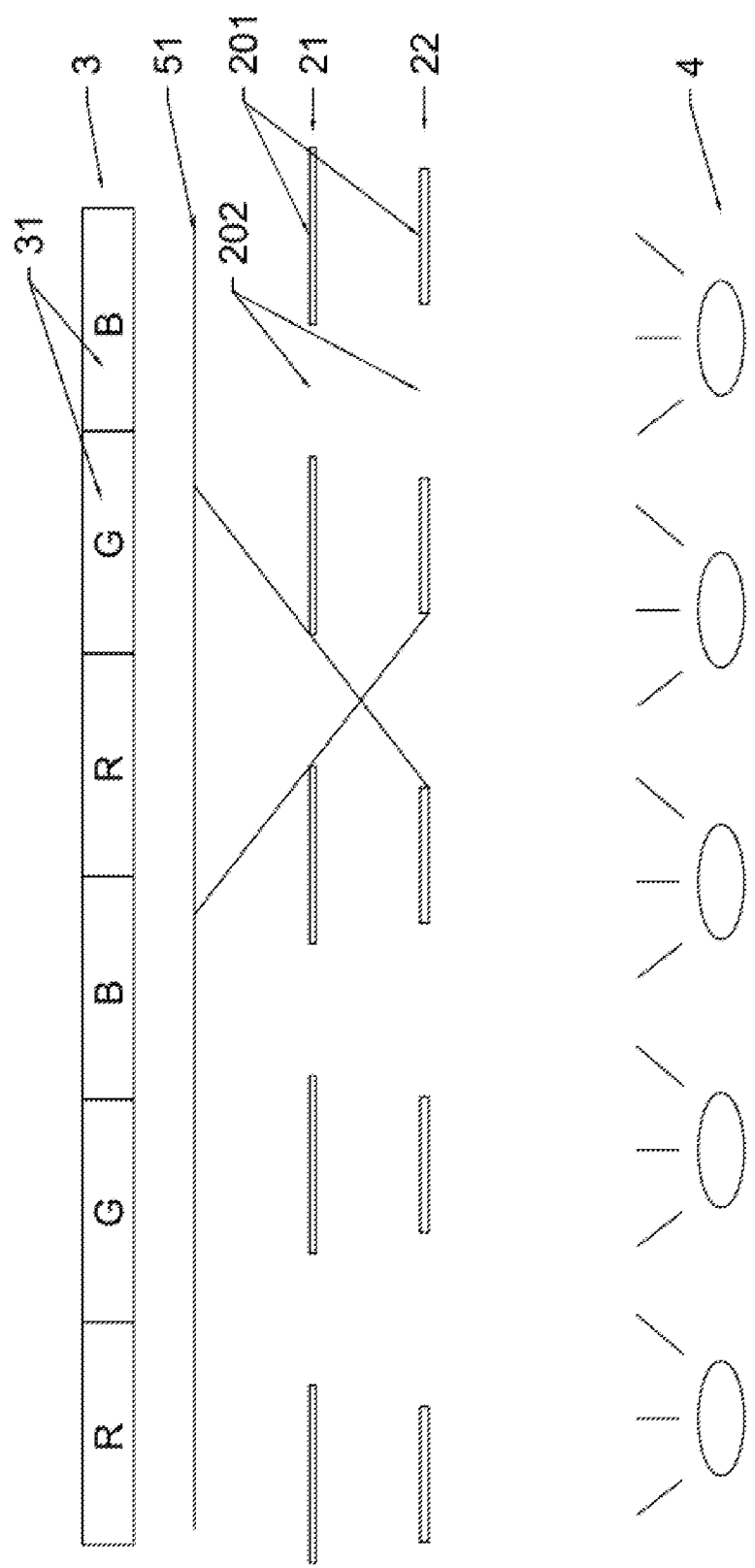
FIG. 4 is a schematic diagram of a principle of a normal display mode in an anti-peep display provided by another embodiment of the present disclosure.

FIG. 3 is a schematic diagram of a principle of an anti-peep display mode in an anti-peep display provided by another embodiment of the present disclosure. FIG. 4 is a schematic diagram of a principle of a normal display mode in an anti-peep display provided by another embodiment of the present disclosure. Likewise, in FIG. 3 and FIG. 4, light indicated by dotted lines is the light that is blocked and may not be incident on the liquid crystal layer, while light indicated by solid lines is the light that may be incident on the liquid crystal layer.

In some embodiments, as shown in FIG. 3 and FIG. 4, the first black matrix layer 21, the second black matrix layer 22 and the grating layer 1 are sequentially arranged from the liquid crystal layer to the backlight source 4. The liquid crystal layer described herein is the liquid crystal layer of the liquid crystal display screen 3, rather than the liquid crystal unit of the grating layer.

Under the condition of satisfying the arrangement order of all the layers in the embodiment, an aperture ratio of the anti-peep display may be increased as much as possible by reasonably setting the widths of the black matrix layer light-blocking area 201 and the black matrix layer light-transmitting area 202 of the first black matrix layer 21, the widths of the black matrix layer light-blocking area 201 and the black matrix layer light-transmitting area 202 of the second black matrix layer 22, the width of the grating layer controllable light-blocking area 101, the width of the grating layer light-transmitting area 102 and the distance between the black matrix layer 2 (including the first black matrix layer 21 and the second black matrix layer 22) and the grating layer 1, so as to reduce the energy consumption of the anti-peep display on the premise that the anti-peep display meets the standards of the anti-peep display mode and the normal display mode. In some embodiments of the present disclosure, the distance between the first black matrix layer 21 and the second black matrix layer 22 may be equal to the distance between the second black matrix layer 22 and the grating layer 1.

Figure 5:
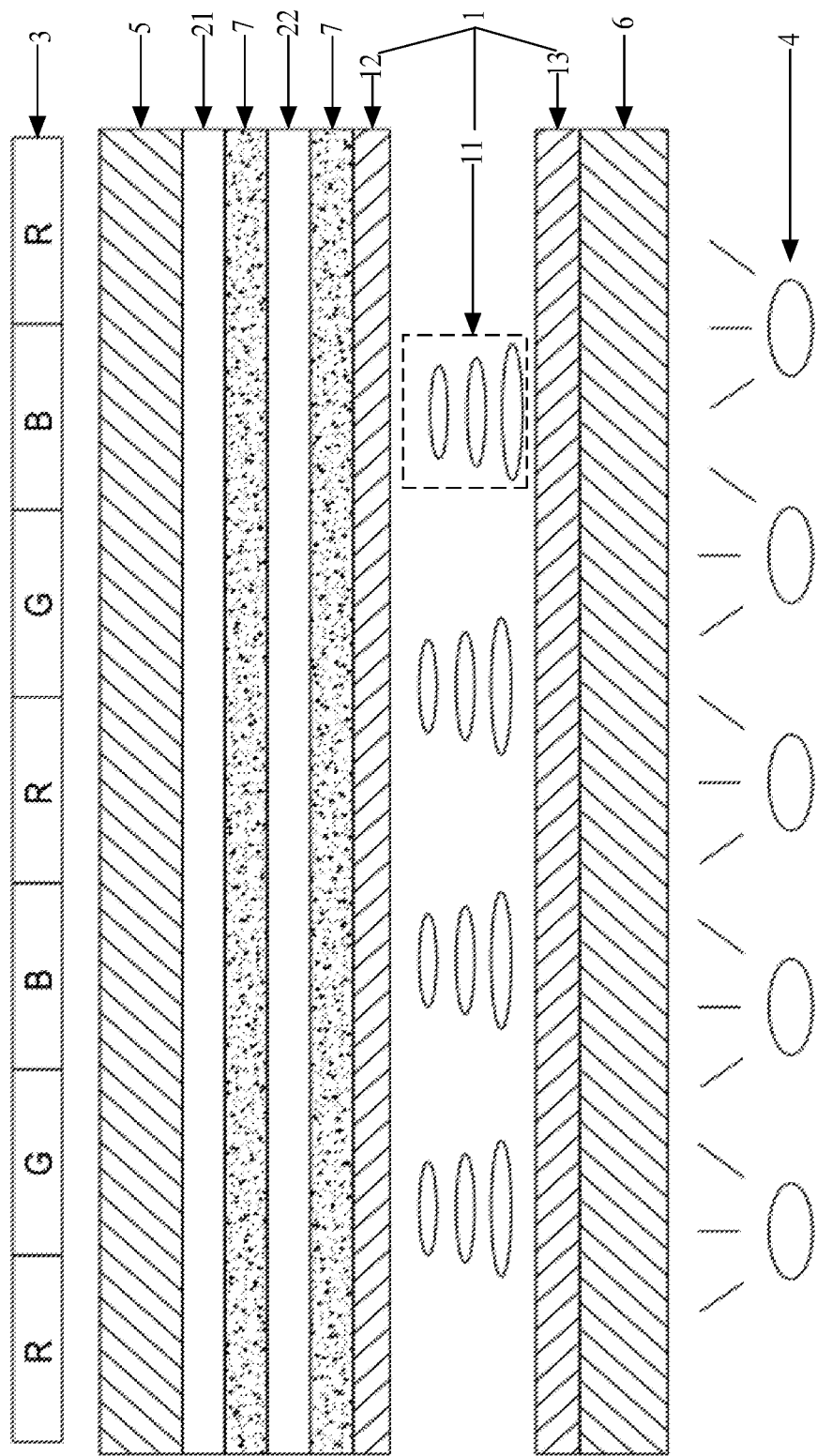
FIG. 5 is a schematic diagram of a structure of an anti-peep display provided by another embodiment of the present disclosure.

FIG. 5 is a diagram of a structure of an anti-peep display provided by another embodiment of the present disclosure. As shown in FIG. 5, in some implementations, the first black matrix layer 21 and the second black matrix layer 22 are sequentially arranged between the upper substrate 5 and the upper electrode layer 12. Planarization filling is performed between the two adjacent black matrix layers 2, as well as between the black matrix layer 2 and the upper electrode layer 12, by means of the filling layer 7. It should be noted that in the anti-peep display as shown in FIG. 5, the first black matrix layer 21, the filling layer 7, the second black matrix layer 22, the filling layer 7 and the upper electrode layer 12 are sequentially arranged on the upper substrate 5. A planarization layer (not shown in FIG. 5) may be further arranged on the upper electrode layer 12. The lower electrode layer 13 is arranged on the lower substrate 6. A planarization layer (not shown in FIG. 5) may be further arranged on the lower electrode layer 13.

In the embodiment, when a width of the black matrix layer light-blocking area of the first black matrix layer is equal to a width of the grating layer controllable light-blocking area of the grating layer, a width of the black matrix layer light-blocking area of the first black matrix layer is more than a width of the black matrix layer light-blocking area of the second black matrix layer, and the first black matrix layer, the second black matrix layer and the grating layer are sequentially and equidistantly arranged, the anti-peep display in the embodiment may realize an anti-peep-display-mode viewing angle of about 20° and a normal-display-mode viewing angle of about 90°. The aperture ratio of the anti-peep display may be more than 40% after the light emitted by the backlight source is blocked by the grating layer, the first black matrix layer and the second black matrix layer.

Figure 6:
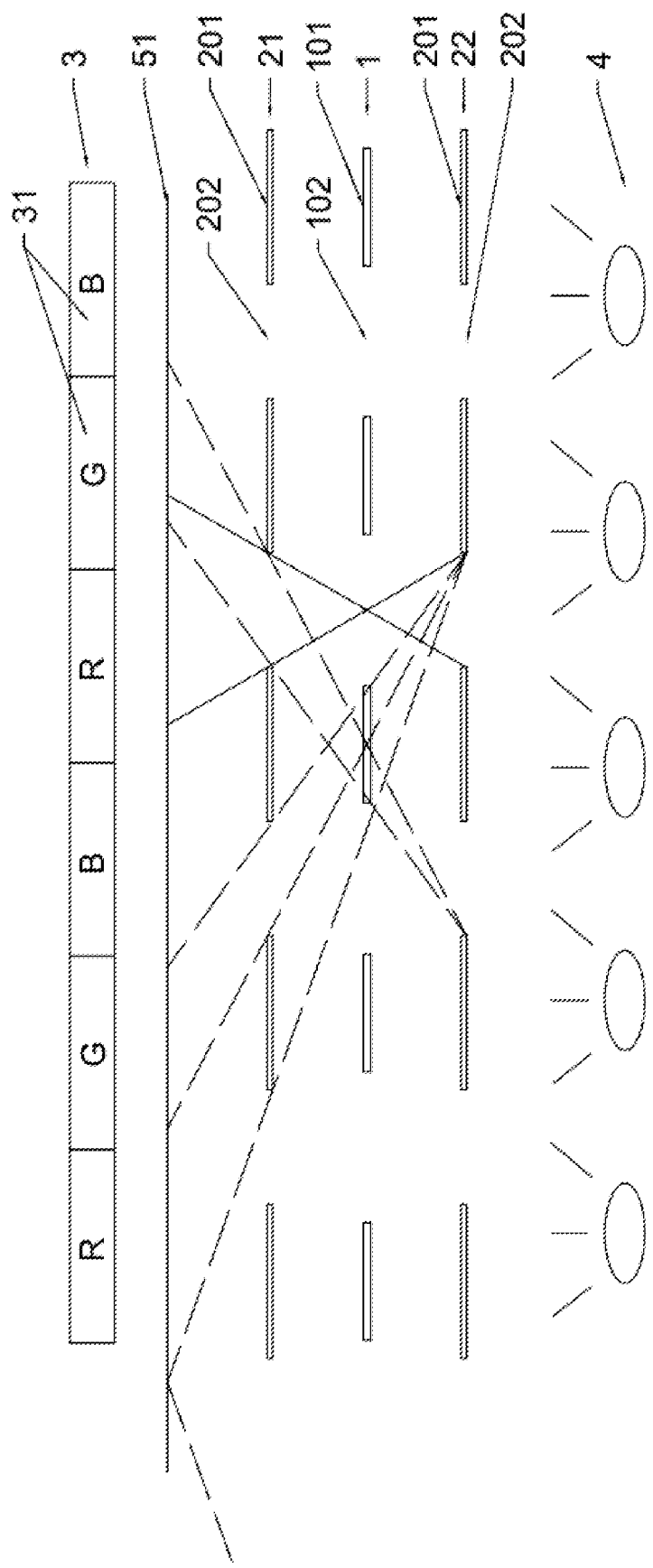
FIG. 6 is a schematic diagram of a principle of an anti-peep display mode in an anti-peep display provided by another embodiment of the present disclosure.
Figure 7:
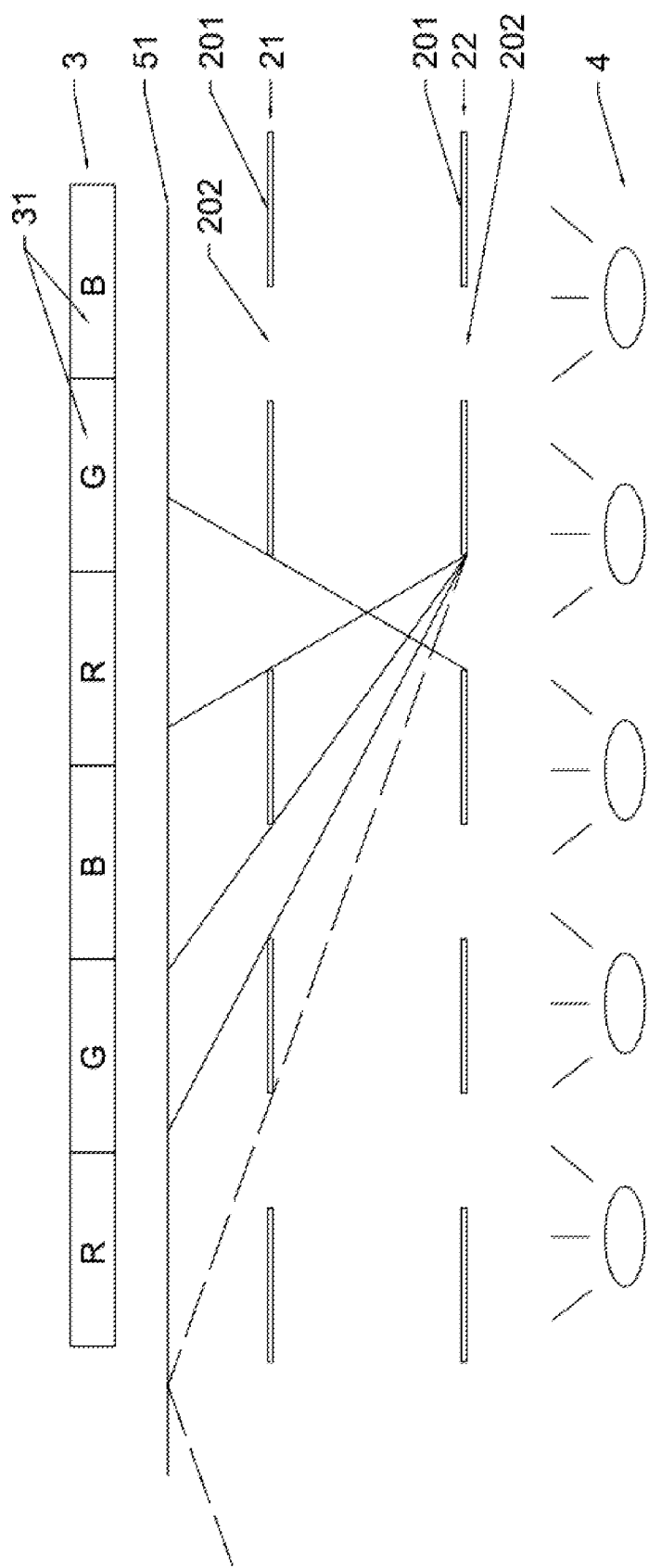
FIG. 7 is a schematic diagram of a principle of a normal display mode in an anti-peep display provided by another embodiment of the present disclosure.

FIG. 6 is a schematic diagram of a principle of an anti-peep display mode in an anti-peep display provided by another embodiment of the present disclosure. FIG. 7 is a schematic diagram of a principle of a normal display mode in an anti-peep display provided by another embodiment of the present disclosure. Likewise, light indicated by dotted lines is the light that is blocked and may not be incident on the liquid crystal layer of the liquid crystal display screen, while light indicated by solid lines is the light that may be incident on the liquid crystal layer of the liquid crystal display screen.

In some embodiments, the first black matrix layer 21, the grating layer 1 and the second black matrix layer 22 are sequentially arranged from the liquid crystal layer to the backlight source 4. The liquid crystal layer described herein is the liquid crystal layer of the liquid crystal display screen 3, rather than the liquid crystal unit of the grating layer.

Under the condition of satisfying the arrangement order of all the layers in the embodiment, an aperture ratio of the anti-peep display may be increased as much as possible by reasonably setting the widths of the black matrix layer light-blocking area 201 and the black matrix layer light-transmitting area 202 of the first black matrix layer 21, the widths of the black matrix layer light-blocking area 201 and the black matrix layer light-transmitting area 202 of the second black matrix layer 22, the width of the grating layer controllable light-blocking area 101, the width of the grating layer light-transmitting area 102 and the distance between the black matrix layer 2 (including the first black matrix layer 12 and the second black matrix layer 22) and the grating layer 1, so as to reduce the energy consumption of the anti-peep display on the premise that the anti-peep display meets the standards of the anti-peep display mode and the normal display mode. In some embodiments of the present disclosure, the distance between the first black matrix layer 21 and the grating layer 1 may be equal to the distance between the grating layer 1 and the second black matrix layer 22.

Figure 8:
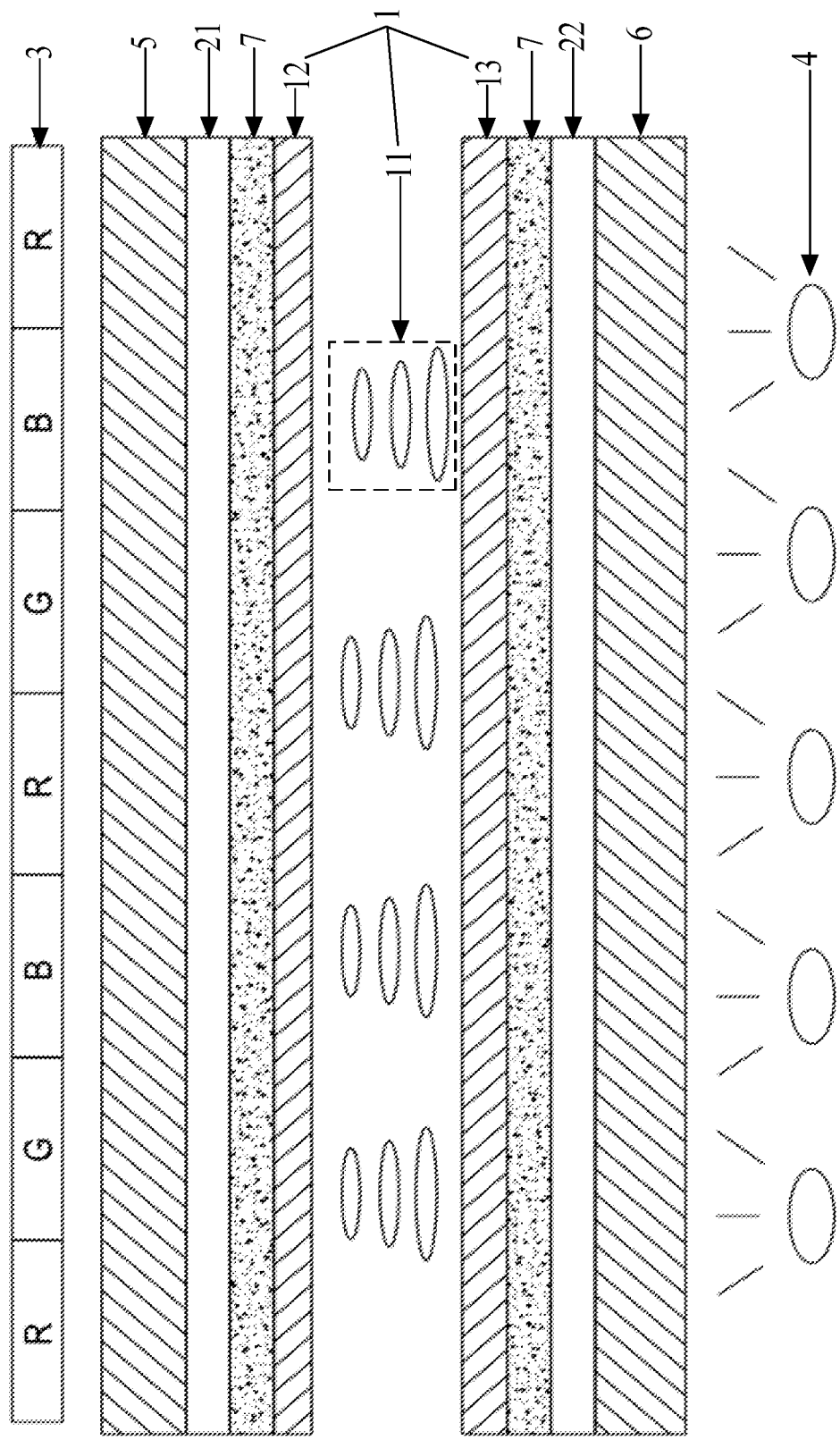
FIG. 8 is a schematic diagram of a structure of an anti-peep display provided by another embodiment of the present disclosure.

FIG. 8 is a schematic diagram of a structure of an anti-peep display provided by another embodiment of the present disclosure. As shown in FIG. 8, in some implementations, the first black matrix layer 21 is arranged between the upper substrate 5 and the upper electrode layer 12. Planarization filling is performed between the first black matrix layer 21 and the upper electrode layer 12 by means of the filling layer 7. The second black matrix layer 22 is arranged between the lower substrate 6 and the lower electrode layer 13. Filling is performed between the second black matrix layer 22 and the lower electrode layer 13 by means of the filling layer 7. It should be noted that in the anti-peep display as shown in FIG. 8, the first black matrix layer 21, the filling layer 7 and the upper electrode layer 12 are sequentially arranged on the upper substrate 5. A planarization layer (not shown in FIG. 8) may be further arranged on the upper electrode layer 12. The second black matrix layer 12, the filling layer 7 and the lower electrode layer 13 are sequentially arranged on the lower substrate 6. A planarization layer (not shown in FIG. 8) may be further arranged on the lower electrode layer 13.

Compared with the previous embodiments, the arrangement order of all the layers is slightly different in this embodiment, which may also achieve a favorable anti-peer effect. When a width of the black matrix layer light-blocking area of the first black matrix layer is equal to a width of the black matrix layer light-blocking area of the second black matrix layer, a width of the black matrix layer light-blocking area of the first black matrix layer is more than a width of the grating layer controllable light-blocking area of the grating layer, and the first black matrix layer, the second black matrix layer and the grating layer are sequentially and equidistantly arranged, the anti-peep display in the embodiment may realize an anti-peep-display-mode viewing angle of about 30° and a normal-display-mode viewing angle of about 90°. The aperture ratio of the anti-peep display may be more than 40% after the light emitted from the backlight source to the liquid crystal layer of the liquid crystal display screen is blocked by the grating layer, the first black matrix layer and the second black matrix layer.

In some implementations, the grating layer, the first black matrix layer and the second black matrix layer are sequentially arranged from the liquid crystal layer to the backlight source. Similarly, with proper configuration, an aperture ratio, which is superior to the aperture ratio under the condition of the single black matrix layer and the single grating layer, may be achieved on the premise of ensuring the anti-peer angle, which will not be repeated in the embodiment.

Based on the same objective, in a second aspect of the embodiment of the present disclosure, there is provided a liquid crystal display device including the anti-peep display described in any above-mentioned embodiment. The liquid crystal display device may be a mobile phone, a tablet computer, a television, a display, a laptop, a digital photo frame, a navigator and any other products or components with a display function.

Based on the same objective, in a third aspect of the embodiment of the present disclosure, there is provided an anti-peep component. The anti-peep component may be arranged between a liquid crystal display screen and a backlight source and may be used to prevent image information displayed on the liquid crystal display screen from being peeped.

Figure 9:
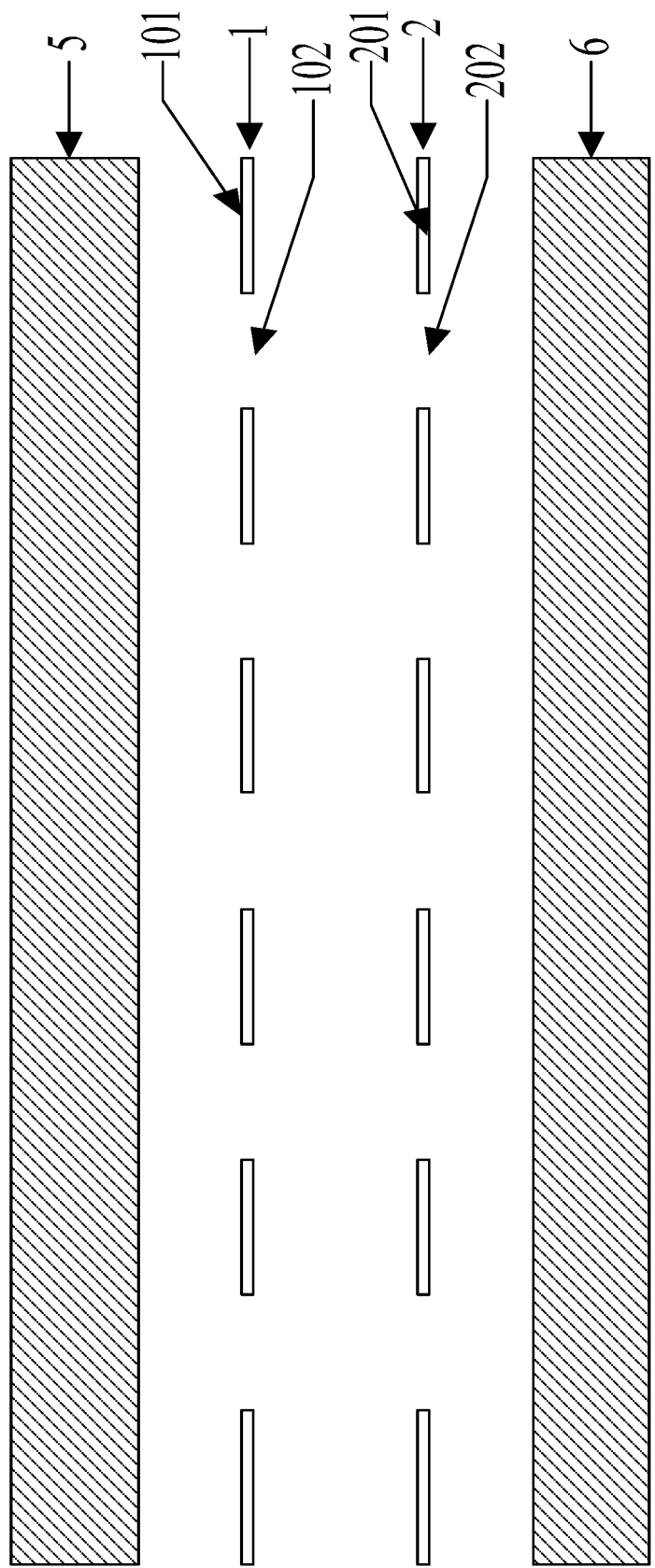
FIG. 9 is a schematic diagram of a structure of an anti-peep component provided by an embodiment of the present disclosure.

FIG. 9 is a schematic diagram of a structure of an anti-peep component provided by an embodiment of the present disclosure. Referring to FIG. 9, the anti-peep component includes an upper substrate 5 and a lower substrate 6 that are that are oppositely arranged, and a grating layer 1 and a black matrix layer 2 that are located between the upper substrate 5 and the lower substrate 6. The grating layer 1 includes a grating layer controllable light-blocking area 101 and a grating layer light-transmitting area 102 that are alternately arranged. The black matrix layer 2 includes a black matrix layer light-blocking area 201 and a black matrix layer light-transmitting area 202 that are alternately arranged. The grating layer light-transmitting area 102 and the black matrix layer light-transmitting area 202 are in one-to-one correspondence. The grating layer light-transmitting area 102 is aligned with the corresponding black matrix layer light-transmitting area 202 in a direction perpendicular to the upper substrate 5.

The grating layer light-transmitting area 102 is aligned with the corresponding black matrix layer light-transmitting area 202 in the direction perpendicular to the upper substrate 5. That is, each grating layer light-transmitting area 102 is aligned with the black matrix layer light-transmitting area 202 corresponding to the each grating layer light-transmitting area 102 in the direction perpendicular to the upper substrate 5. A center line of each grating layer light-transmitting area 102 coincides with a center line of the corresponding black matrix layer light-transmitting area 202. In other words, an orthographic projection of each grating layer light-transmitting area 102 on a preset plane (for example, a board surface of the upper substrate 5) coincides with an orthographic projection of the corresponding black matrix layer light-transmitting area 202 on the preset plane.

It should be noted that in practice, when the anti-peep component is arranged between the liquid crystal display screen and the backlight source, the upper substrate 5 of the anti-peep component may be reused with a substrate of the liquid crystal display screen, and the lower substrate 6 may be reused with a substrate of the backlight source. In this embodiment, realization of the anti-peer function of the anti-peep component, a forming material of the black matrix layer 2, the arrangement order of the grating layer 1 and the black matrix layer, etc. may all refer to the embodiments of the above-mentioned anti-peep display, and will not be repeated in this embodiment.

Figure 10:
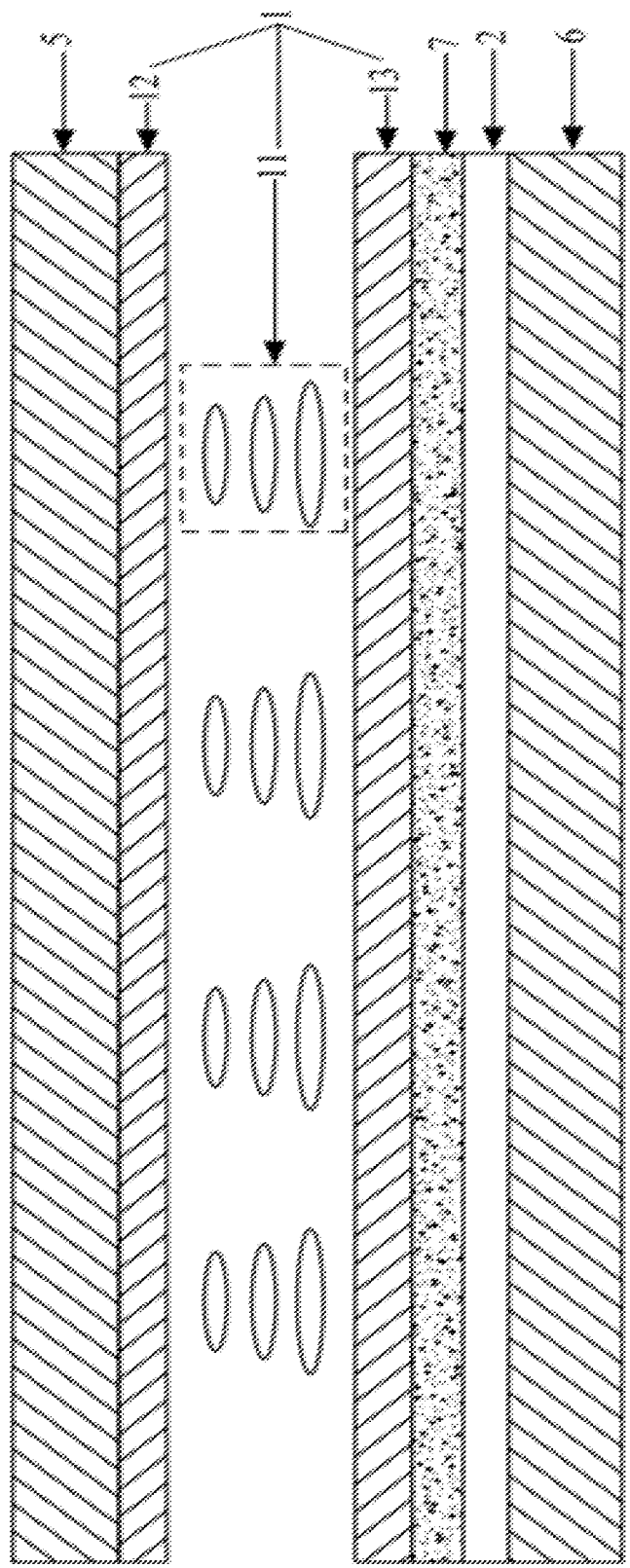
FIG. 10 is a schematic diagram of a structure of an anti-peep component provided by another embodiment of the present disclosure.

FIG. 10 is a schematic diagram of a structure of an anti-peep component provided by another embodiment of the present disclosure.

In some embodiments, with reference to FIG. 9 and FIG. 10, a grating layer 1 includes an upper electrode layer 12 and a lower electrode layer 13 that are oppositely arranged, and a liquid crystal unit 11 arranged between the upper electrode layer 12 and the lower electrode layer 13. The upper electrode layer 12, the liquid crystal unit 11 and the lower electrode layer 13 form a grating layer controllable light-blocking area 101. A grating layer light-transmitting area 102 is formed between the two adjacent liquid crystal units 11. The upper electrode layer 12 may be arranged on the upper substrate 5. The black matrix layer 2 and the lower electrode layer 13 may be sequentially arranged on the lower substrate 6. The liquid crystal unit 11 is arranged between the upper electrode layer 12 and the lower electrode layer 13. The edges of the upper substrate 5 and the lower substrate 6 are sealed. It should be noted that in the embodiment of the anti-peep component provided by the present disclosure, descriptions of the upper electrode layer 12 and the lower electrode layer 13, the relationship among the upper electrode layer 12, the lower electrode layer 13 and the liquid crystal unit 11, as well as the description that a control module controls the liquid crystal unit 11 to be in the light-blocking state or in the light-transmitting state may all refer to the embodiments of the above-mentioned anti-peep display and will not be repeated in this embodiment.

Referring to FIG. 10 again, in some implementations, the anti-peep component further includes a filling layer 7 used to adjust a layer spacing and arranged between the grating layer 1 and the black matrix layer 2. Alternatively, the filling layer 7 may also be arranged between the two adjacent black matrix layers 2 when the anti-peep component includes at least two black matrix layers 2. Functions of the filling layer 7 may refer to the embodiments of the above-mentioned anti-peep display, and will not be repeated in this embodiment.

In some embodiments, the number of the grating layer is one. The number of the black matrix layers is two, i.e., a first black matrix layer and a second black matrix layer. A width of the single black matrix layer light-blocking area of the second black matrix layer may be less than a width of the single black matrix layer light-transmitting area of the first black matrix layer, so as to ensure that the black matrix layer light-blocking area of the second black matrix layer may not block the black matrix layer light-transmitting area of the first black matrix layer, thereby ensuring that the light may successfully penetrate the first black matrix layer at an arbitrary angle.

Figure 11:
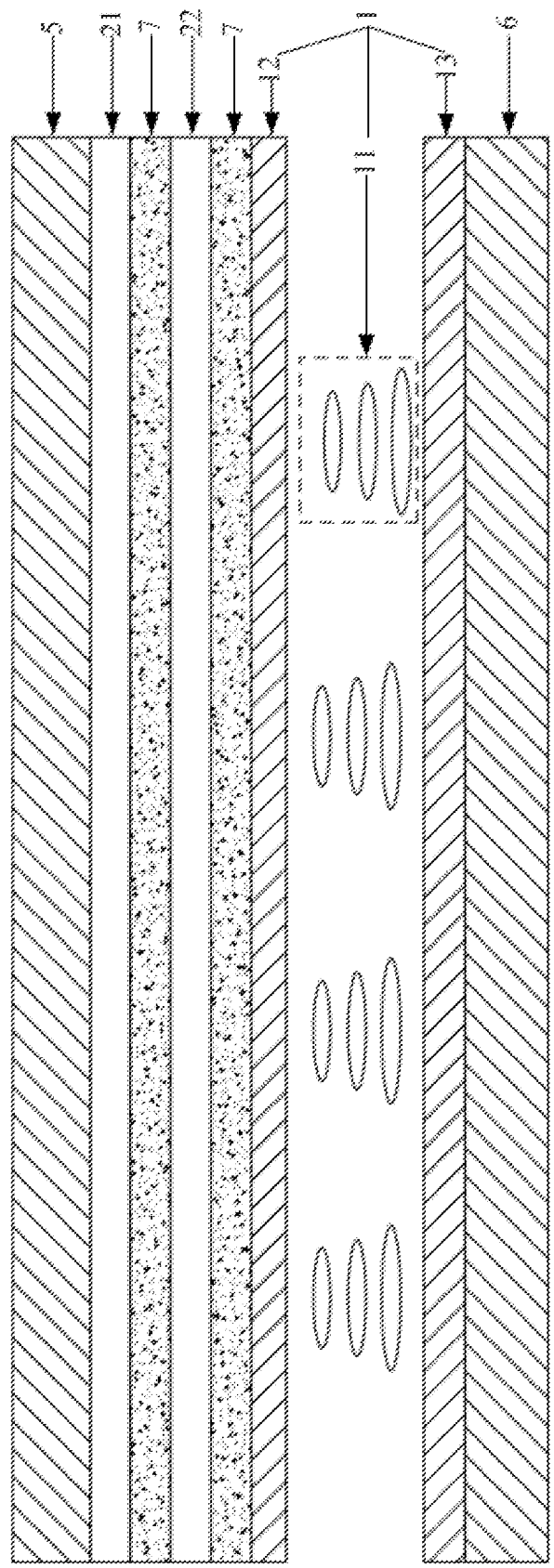
FIG. 11 is a schematic diagram of a structure of an anti-peep component provided by yet another embodiment of the present disclosure.

In some embodiments, as shown in FIG. 11, the first black matrix layer 21, the second black matrix layer 22 and the grating layer 1 are sequentially arranged from the upper substrate 5 to the lower substrate 6. A distance between the first black matrix layer 21 and the second black matrix layer 22 may be equal to a distance between the second black matrix layer 22 and the grating layer 1. As shown in FIG. 11, planarization filling is performed between the first black matrix layer 21 and the second black matrix layer 22, as well as between the second black matrix layer 22 and the upper electrode layer 12, by means of the filling layer 7. In the anti-peep component shown in FIG. 11, the first black matrix layer 21, the filling layer 7, the second black matrix layer 22, the filling layer 7 and the upper electrode layer 12 are sequentially arranged on the upper substrate 5. A planarization layer (not shown in FIG. 11) may be further arranged on the upper electrode layer 12. The lower electrode layer 13 is arranged on the lower substrate 6. A planarization layer (not shown in FIG. 11) may be further arranged on the lower electrode layer 13. In the embodiment of the present disclosure, a width of the black matrix layer light-blocking area 201 of the first black matrix layer 21 may be equal to a width of the grating layer controllable light-blocking area 101 of the grating layer 1, or may be more than a width of the black matrix layer light-blocking area 201 of the second black matrix layer 22. The first black matrix layer 21, the second black matrix layer 22 and the grating layer 1 are sequentially and equidistantly arranged.

Figure 12:
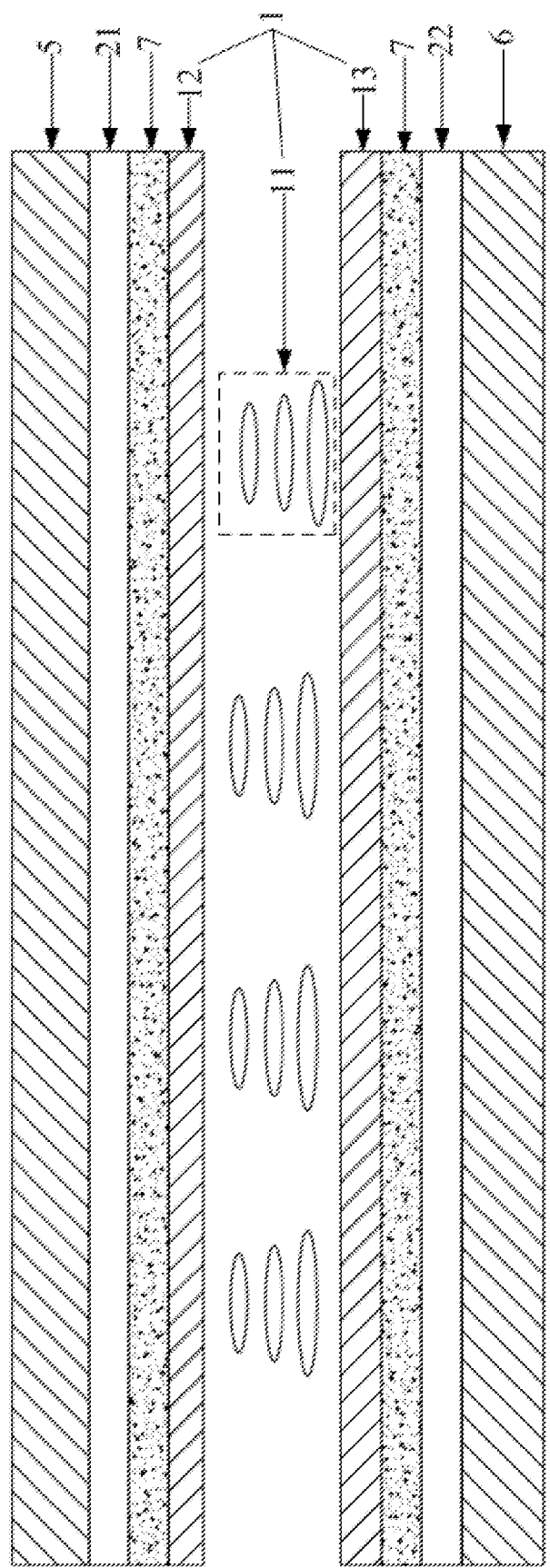
FIG. 12 is a schematic diagram of a structure of an anti-peep component provided by still another embodiment of the present disclosure.

In some embodiments, as shown in FIG. 12, the first black matrix layer 21, the grating layer 1 and the second black matrix layer 22 are sequentially arranged from the upper substrate 5 to the lower substrate 6. A distance between the first black matrix layer 21 and the grating layer 1 is equal to a distance between the grating layer 1 and the second black matrix layer 22. As shown in FIG. 12, planarization filling is performed between the first black matrix layer 21 and the upper electrode layer 12, as well as between the second black matrix layer 22 and the lower electrode layer 13, by means of the filling layer 7. In the anti-peep component shown in FIG. 12, the first black matrix layer 21, the filling layer 7 and the upper electrode layer 12 are sequentially arranged on the upper substrate 5. A planarization layer (not shown in FIG. 12) may be further arranged on the upper electrode layer 12. The second black matrix layer 22, the filling layer 7 and the lower electrode layer 13 are arranged on the lower substrate 6. A planarization layer (not shown in FIG. 12) may be further arranged on the lower electrode layer 13. In the embodiment of the present disclosure, a width of the black matrix layer light-blocking area 201 of the first black matrix layer 21 may be equal to a width of the black matrix layer light-blocking area 201 of the second black matrix layer 22, or may be more than a width of the grating layer controllable light-blocking area 101 of the grating layer 1. The first black matrix layer 21, the second black matrix layer 22 and the grating layer 1 are sequentially and equidistantly arranged.

It should be noted that the arrangement order of the first black matrix layer 21, the second black matrix layer 22 and the grating layer 1 is merely exemplary in the embodiment of the present disclosure, and may be adjusted according to actual conditions in practice to guarantee the anti-peer angle of the anti-peep component.

It also should be noted that the embodiment of the present disclosure only briefly explains the structure of the anti-peep component. The peep prevention principle of the anti-peep component is the same as or similar to that of the anti-peep display. Therefore, descriptions of the peep prevention principle of the anti-peep component may refer to the embodiments of the above-mentioned anti-peep display and will not be repeated in this embodiment of the present disclosure.

The term "and/or" in the present disclosure, which is merely used to describe association relations among associated objects, may indicate three relations. For example, "A and/or B" may indicate that A exists alone; A and B exist simultaneously; or B exists alone. Besides, the character "/" in the present disclosure generally indicates that there is an "or" relationship between associated objects before and after an object.

Persons of ordinary skill in the art should understand that the discussion of above embodiment is merely exemplary and is not intended to imply that the scope of the present application (including the claims) is limited to these examples. Under the idea of the present application, the technical features either in the above embodiments or in different embodiments may also be combined, the steps thereof may be implemented in any order, and there are many other variations of different aspects of the application as described above, which are not provided in the details for the sake of brevity. Therefore, any omissions, modifications, equivalent replacements and improvements made within the spirit and principles of the present disclosure shall be included in the protection scope of the present disclosure.

The invention claimed is:

1. An anti-peep display, comprising:
a backlight source;
a liquid crystal display screen comprising a liquid crystal layer;
a grating layer located between the liquid crystal layer and the backlight source and comprising a grating layer controllable light-blocking area and a grating layer light-transmitting area that are alternately arranged; and
a black matrix layer located between the liquid crystal layer and the backlight source and comprising a black matrix layer light-blocking area and a black matrix layer light-transmitting area that are alternately arranged,
wherein, the grating layer light-transmitting area and the black matrix layer light-transmitting area are in one-to-one correspondence, and the grating layer light-transmitting area is aligned with the black matrix layer light-transmitting area corresponding to the grating layer light-transmitting area in a direction perpendicular to the liquid crystal layer.

2. The anti-peep display according to claim 1, wherein a width of the black matrix layer light-blocking area is less than a width of a sub-pixel of the liquid crystal display screen.

3. The anti-peep display according to claim 1, wherein the grating layer comprises an upper electrode layer and a lower electrode layer that are oppositely arranged, and a liquid crystal unit arranged between the upper electrode layer and the lower electrode layer; wherein the upper electrode layer, the liquid crystal unit and the lower electrode layer form the grating layer controllable light-blocking area, and the grating layer light-transmitting area is formed between two adjacent liquid crystal units.

4. The anti-peep display according to claim 1, wherein the black matrix layer comprises the black matrix layer light-blocking area made of a lightproof material, and the black matrix layer light-transmitting area is formed between two adjacent black matrix layer light-blocking areas.

5. The anti-peep display according to claim 1, wherein when the anti-peep display is in an anti-peep display mode, a distance between the grating layer and the black matrix layer, a distance between the two adjacent grating layer controllable light-blocking areas and a distance between the two adjacent black matrix layer light-blocking areas are arranged, so as enable light with an incident angle larger than an anti-peer angle to be blocked by the grating layer controllable light-blocking area, or to be totally reflected before entering the liquid crystal display screen.

6. The anti-peep display according to claim 1, wherein a number of the grating layer is one; a number of the black matrix layers is two, namely a first black matrix layer and a second black matrix layer; a distance between the first black matrix layer and the liquid crystal layer is less than a distance between the second black matrix layer and the liquid crystal layer; a width of a single black matrix layer light-blocking area of the second black matrix layer is less than a width of a single black matrix layer light-transmitting area of the first black matrix layer; and a sum of a width of a single black matrix layer light-blocking area of the first black matrix layer and the width of the single black matrix layer light-blocking area of the second black matrix layer is less than a width of a sub-pixel of the liquid crystal display.

7. The anti-peep display according to claim 6, wherein the first black matrix layer, the second black matrix layer and the grating layer are sequentially arranged from the liquid crystal layer to the backlight source.

8. The anti-peep display according to claim 7, wherein a distance between the first black matrix layer and the second black matrix layer is equal to a distance between the second black matrix layer and the grating layer.

9. The anti-peep display according to claim 6, wherein the first black matrix layer, the grating layer and the second black matrix layer are sequentially arranged from the liquid crystal layer to the backlight source.

10. The anti-peep display according to claim 9, wherein a distance between the first black matrix layer and the grating layer is equal to a distance between the grating layer and the second black matrix layer.

11. The anti-peep display according to claim 1, wherein the width of the black matrix layer light-blocking area is equal to a width of the grating layer controllable light-blocking area.

12. The anti-peep display according to claim 1, further comprising a filling layer configured to adjust a layer spacing, wherein the filling layer is arranged between the grating layer and the black matrix layer, or between two adjacent black matrix layers.

13. A liquid crystal display device, comprising an anti-peep display wherein the anti-peep display comprises
a backlight source;
a liquid crystal display screen comprising a liquid crystal layer;
a grating layer located between the liquid crystal layer and the backlight source and comprising a grating layer controllable light-blocking area and a grating layer light-transmitting area that are alternately arranged; and a black matrix layer located between the liquid crystal layer and the backlight source and comprising a black matrix layer light-blocking area and a black matrix layer light-transmitting area that are alternately arranged, wherein, the grating layer light-transmitting area and the black matrix layer light-transmitting area are in one-to-one correspondence, and the grating layer light-transmitting area is aligned with the black matrix layer light-transmitting area corresponding to the grating layer light-transmitting area in a direction perpendicular to the light crystal layer.

14. An anti-peep component, comprising:

an upper substrate and a lower substrate that are oppositely arranged, and a grating layer and a black matrix layer that are located between the upper substrate and the lower substrate, wherein the grating layer comprises a grating layer controllable light-blocking area and a grating layer light-transmitting area that are alternately arranged; the black matrix layer comprises a black matrix layer light-blocking area and a black matrix layer light-transmitting area that are alternately arranged; and the grating layer light-transmitting area and the black matrix layer light-transmitting area are in one-to-one correspondence, and the grating layer light-transmitting area is aligned with a black matrix layer light-transmitting area corresponding to the grating layer light-transmitting area in a direction perpendicular to the upper substrate.

15. The anti-peep component according to claim 14, wherein the grating layer comprises an upper electrode layer and a lower electrode layer that are oppositely arranged, and a liquid crystal unit arranged between the upper electrode layer and the lower electrode layer, the upper electrode layer, the liquid crystal unit and the lower electrode layer form the grating layer controllable light-blocking area, and the grating layer light-transmitting area is formed between two adjacent liquid crystal units.

16. The anti-peep component according to claim 14, wherein the black matrix layer comprises the black matrix layer light-blocking area made of a lightproof material; and the black matrix layer light-transmitting area is formed between two adjacent black matrix layer light-blocking areas.

17. The anti-peep component according to claim 14, wherein a number of the grating layer is one; a number of the black matrix layers is two, namely a first black matrix layer and a second black matrix layer; and a width of a single black matrix layer light-blocking area of the second black matrix layer is less than a width of a single black matrix layer light-transmitting area of the first black matrix layer.

18. The anti-peep component according to claim 17, wherein the first black matrix layer, the second black matrix layer and the grating layer are sequentially arranged from the upper substrate to the lower substrate, and a distance between the first black matrix layer and the second black matrix layer is equal to a distance between the second black matrix layer and the grating layer.

19. The anti-peep component according to claim 17, wherein the first black matrix layer, the grating layer and the second black matrix layer are sequentially arranged from the upper substrate to the lower substrate, and a distance between the first black matrix layer and the grating layer is equal to a distance between the grating layer and the second black matrix layer.

20. The anti-peep component according to claim 14, further comprising a filling layer configured to adjust a layer spacing, wherein the filling layer is arranged between the grating layer and the black matrix layer, or between two adjacent black matrix layers.

\* \* \* \* \*